United States Patent
Chamberlain et al.

(10) Patent No.: US 7,149,865 B2
(45) Date of Patent: Dec. 12, 2006

(54) MEMORY ALLOCATION USING MASK-BIT PATTERN TO ENCODE METADATA WITHIN MEMORY ADDRESS

(75) Inventors: Richard Nigel Chamberlain, Southampton (GB); Gordon Douglas Hutchison, Eastleigh (GB)

(73) Assignee: International Business Machines Corporation, Armonk, NY (US)

(*) Notice: Subject to any disclaimer, the term of this patent is extended or adjusted under 35 U.S.C. 154(b) by 310 days.

(21) Appl. No.: 10/814,736

(22) Filed: Mar. 31, 2004

(65) Prior Publication Data
US 2005/0097296 A1 May 5, 2005

(30) Foreign Application Priority Data
Nov. 5, 2003 (GB) .................. 0325788.8

(51) Int. Cl.
*G06F 12/00* (2006.01)
(52) U.S. Cl. ............... 711/170; 711/171; 711/172; 711/173; 711/212
(58) Field of Classification Search .......... 711/170, 711/171, 172, 173, 1–6, 200–221
See application file for complete search history.

(56) References Cited

U.S. PATENT DOCUMENTS

| | | | | |
|---|---|---|---|---|
| 5,706,469 A | * | 1/1998 | Kobayashi | 710/240 |
| 5,860,144 A | * | 1/1999 | Frank et al. | 711/206 |
| 6,167,472 A | * | 12/2000 | Mitra et al. | 710/65 |
| 6,421,690 B1 | * | 7/2002 | Kirk, III | 707/206 |
| 6,883,080 B1 | * | 4/2005 | Tanaka et al. | 711/202 |
| 7,016,923 B1 | * | 3/2006 | Garthwaite et al. | 707/206 |
| 2004/0172497 A1 | * | 9/2004 | Liou | 711/5 |

* cited by examiner

*Primary Examiner*—Sanjiv Shah
*Assistant Examiner*—Yaima Campos
(74) *Attorney, Agent, or Firm*—VanLeeuwen & VanLeeuwen; John D. Flynn

(57) ABSTRACT

A method of allocating memory in a data processing system 10 and a memory allocation mechanism 54 are provided. Memory is allocated by the memory allocation mechanism in response to a memory allocation request 56 from a process 50 running on the system 10. The request 56 includes data identifying the size of the block required and an indication of a mask bit pattern. The memory allocation mechanism receives the request, selects a block of memory having an appropriate size and having an address with a bit pattern which corresponds correctly to the indicated mask bit pattern, and allocates the selected block of memory to the process.

20 Claims, 8 Drawing Sheets

MEMORY ALLOCATION USING MASK-BIT PATTERN TO ENCODE METADATA WITHIN MEMORY ADDRESS

FIELD OF THE INVENTION

The present invention relates to the field of data processing systems and in particular to memory allocation in data processing systems.

BACKGROUND OF THE INVENTION

Memory in a data processing system is organized as an array of bytes of 8 bits in length and is allocated as an integral number of words, where a word is a unit of memory of a particular size that the data processing system manipulates in one go. For example in a 32-bit data processing system, the size of a word is 32 bits. Thus memory allocated in a 32-bit data processing system has an integral number of 32-bit words, with each word corresponding to a set of four 8-bit bytes. When allocated, memory is referenced using a memory address, which is a pointer, stored at a specific location in the memory of the data processing system, to the first byte of a first word in the allocated memory.

Memory update operations are preferably atomic. An atomic update operation is a sequence of operations or instructions that are non-interruptible to update a memory location. In other words, when a first computer process starts to update a data value there must be no chance that a second process can read the memory location holding the data value between the point at which the first process reads the memory location and the point at which the first process writes the updated value back to the memory location. If such a read operation by the second process occurred, then the first and second processes would each have the same value, and this may lead to an error or system crash. Atomically updating a shared memory location prevents multiple computer entities or processes from performing the same operation and/or destroying work done by another computer entity or process.

To achieve high performance on multiprocessor systems, many applications make use of multi-threaded or multi-process code, communicating through storage. Memory models known as 'weakly consistent' have been developed. These allow the parallelization of storage operations among the internal processing units, the cache, and main storage, in a number of 'pipelines'. One result is increased speed and performance due to optimised throughput. However, another result is that the processor might perform memory accesses in a different order than the load and store instructions in the program.

One method for atomically updating a shared memory location and for dealing with weak consistency is to acquire locks on the memory location in order to limit modification of the shared memory location to the lock holder. Although this method ensures atomic updating of the memory location, performance is reduced both due to the overhead involved in the acquisition and release of locks on the memory location and the fact that other processes must wait to update the memory location until the lock on the memory location is released. In the case of a weakly consistent system with multiple pipelines running on a processor, the processor must empty its pipelines and make sure that memory accesses are completed for all program instructions which are ordered before the special locking instruction in the program sequence. This significantly slows down the system and therefore there is a need for ways to reduce the number of locks that must be acquired.

A method of atomically updating a memory location that achieves optimal performance uses low-level instructions to perform the update. Machine code instructions, such as compare-and-swap, fetch-and-add, and test-and-set, work on one word at a time and are carried out atomically.

One way the speed of data updates can be increased is by embedding metadata or flags relating to a piece of data, often called a 'data structure', into its memory address. A common technique is to embed flags into the pointer (memory address) making use of the boundary alignment of the data processing system. Word alignment depends on the word size of the data processing system. For example, if a first memory word is referenced as being at address 0 (0 in binary), in a 32-bit data processing system the start of a second memory word will be displaced four bytes from the start of the first memory word and can be referenced as being at address 4 (100 in binary). Subsequent memory words in the 32-bit system will be spaced at four byte intervals and can be referenced as having addresses 8 (1000 in binary), 12 (1100 in binary) and so on. It can be noted that there is a zero in the two least significant bits of each address. These bits can be used to store additional information relating to the allocated memory. However, the number of bits available for the storage of such additional information is limited and is dependent on the word size of a particular data processing system. For example, in a 32-bit data processing system a word is a set of four bytes and memory addresses have a zero in the two least significant bits. In a 64-bit data processing system a word is a set of eight bytes and memory addresses have a zero in the three least significant bits. Thus, computer software written for a 64-bit data processing system and utilizing the three least significant bits of a memory address to store additional information may not be portable to a 32-bit data processing system where only the least two significant bits of memory are available for such use.

Thus computer software written using word or boundary alignment may not be portable to different data processing systems and this may lead to errors. Often this is overcome by only using the last two bits of a memory address for storing additional information such as flags. However, two bits are often not enough to embed the desired additional data. Moreover, as using machine instructions to atomically update a value is only possible when the value on which they are working is a single word, if the value is contained in two or more words, then a locking mechanism must be used.

Therefore, there exists a need for an improved method which addresses the above-mentioned problems.

SUMMARY OF THE INVENTION

According to a first aspect of the invention, there is provided a method of allocating memory in a data processing system having a memory, the method comprising the steps of: receiving a memory allocation request from a running process, the request including data relating to the size of the block of memory required and an indication of a mask bit pattern; selecting a block of memory of appropriate size and having an address including a bit pattern corresponding correctly to the mask bit pattern; and allocating the selected block of memory to the process.

Thus the process specifies the size of the memory block it requires as well as a mask bit pattern. When it receives the allocated memory address it is able to embed one or more flags into bits of the address of the allocated memory, which it specified in the mask bit pattern. Thus it can combine unspecified parts of the allocated address and additional data, such as one or more flags, in one word. This combination, that is the encoded address, can be stored in the pointer storage. When the process needs to access the memory block it can unfold the additional data from the stored pointer and reintroduce the original bits into the stored pointer to recover the memory address of the allocated memory block. Moreover, sometimes a process will be able to gain all the information it requires about a data structure simply by looking at one or more flags embedded into the memory address of that data structure, leading to an increase in speed.

This method of memory allocation is independent of the word or boundary alignment and enables more bits of the address to be used for additional data than may be possible using boundary or word alignment.

In one embodiment a memory allocation mechanism allocates memory such that a particular number of the least significant bits in an address of the allocated memory are guaranteed to be zero. The process indicates a mask bit pattern in which the particular number of least significant bits have a certain value. The memory allocation mechanism selects a memory block whose address corresponds correctly to the mask bit pattern and the particular number of least significant bits of the allocated memory address can then be used to store additional information.

In another embodiment, a memory allocation mechanism allocates memory having an address which includes a specific bit pattern which is not all zeros in the least significant bits.

When a process wishes to access a value, or data structure held in a memory block that has been allocated according to the method described above, the process obtains the stored memory address, which contains the partial address as well as the embedded metadata or flags, and can pull out the flags using the mask bit pattern. To restore the memory address of the data structure, it replaces the flag bits with the original bits.

Thus an embodiment of the present invention allows a programmer to replace as many bits of the memory address with additional data as is required. This encoded address may then be stored in the memory address storage location. This method can allow for faster data update with less use of locks by facilitating the use of atomic compare-and-swap type operations in more cases.

A second aspect of the present invention provides a memory allocation mechanism for a data processing system. The mechanism is operable to receive a memory allocation request, from a process running on the data processing system, the request including data indicating the size of a memory block required and a mask bit pattern. The mechanism is also operable to select an available block of memory of appropriate size and having an address including a bit pattern which corresponds correctly to the mask bit pattern; and to allocate the selected block of memory to the process.

Another aspect of the present invention provides a data processing system comprising a memory, a process running on the data processing system, and a memory allocation mechanism. The memory allocation mechanism is operable to receive a memory allocation request from the process, the request including data relating to the size of the block of memory required and identifying a mask bit pattern, and to select a block of memory of appropriate size and having an address including a bit pattern corresponding to the mask bit pattern, and allocate the selected block of memory to the process.

Another aspect of the invention provides a method of performing a memory update in a data processing system. The method comprises the steps of reading an encoded memory address, comparing the encoded memory address with a mask bit pattern to determine whether one or more flag bits embedded in the encoded memory address are set, resetting one or more of the flag bits in the encoded memory address, and storing the updated encoded memory address in memory.

A further aspect of the invention provides a computer program product directly loadable into the internal memory of a digital computer, comprising software code portions for performing, when said product is run on a computer, the method of allocating memory in a data processing system having a memory, the method comprising the steps of: receiving a memory allocation request from a running process, the request including data relating to the size of the block of memory required and an indication of a mask bit pattern; selecting a block of memory of appropriate size and having an address including a bit pattern corresponding correctly to the mask bit pattern; and allocating the selected block of memory to the process.

BRIEF DESCRIPTION OF THE DRAWINGS

Preferred embodiments of the present invention will now be described by way of example only, with reference to the accompanying drawings in which.

DESCRIPTION OF PARTICULAR EMBODIMENTS

Figure 1:
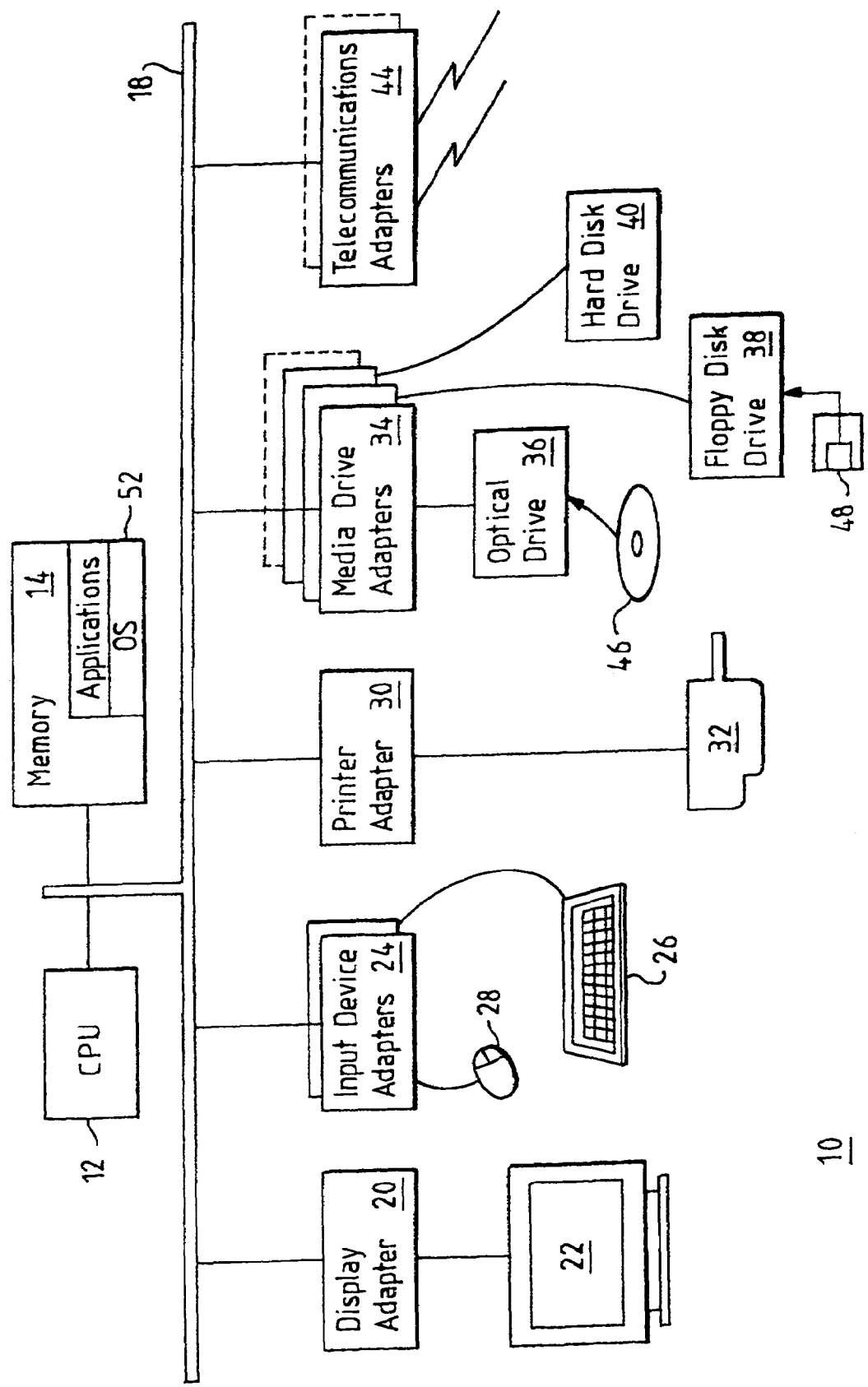
FIG. 1 shows a schematic representation of a data processing system according to an embodiment of the present invention.

Referring to FIG. 1, there is shown a schematic and simplified representation of an illustrative implementation of a data processing system 10. As shown in FIG. 1, the data processing system comprises a processor (CPU) 12, a memory 14 coupled to a bus structure 18. A display adapter 20 connects a display device 22 to the bus structure 18 and one or more user-input device adapters 24 connect the user-input devices such as the keyboard 26 and mouse 28 to the bus structure 18. An adapter 30 for the connection of a printer 32 may also be provided. One or more media drive adapters 34 are provided for connecting media drives, for example an optical disk drive 36, a floppy disk drive 38 and a hard disk drive 40, to the bus structure 42. One or more telecommunications adapters 44, such as a Local Area Network (LAN) adapter, a modem and/or ISDN terminal adapter, can be provided for connecting the data processing system to one or more networks or to other data processing systems.

It will be appreciated that FIG. 1 is a schematic representation of one possible implementation of a data processing system and that this may take many other forms. For example, data processing system 10 may be a non-PC type of computer which is Internet or network compatible, for example a web TV or set-top box for a domestic TV capable of providing access to a computer network such as the Internet. Optionally, the data processing system may be in the form of a wireless Personal Digital Assistant (PDA), or other wireless device. Data processing system 10 may comprise additional processing systems, with each processing system having additional components (or similar components with a different configuration). Moreover, the Input/Output devices shown in FIG. 1 are optional. Component parts of a data processing system may also be interconnected via methods other than a bus, such as a switch, for example. Presentation of a particular data processing system configuration is therefore not limiting on the scope of the invention.

A computer program for implementing various functions or for conveying information may be supplied on media such as one or more DVD/CD-ROMs 46 and/or floppy disks 48 and then stored on a hard disk, for example. The data processing system shown in FIG. 1 may be connected to a network such as the Internet, or a local or wide area dedicated or private network, for example.

A program implementable by a data processing system may also be supplied on a telecommunications medium, for example over a telecommunications network and/or the Internet, and embodied as an electronic signal. For a data processing system operating as a wireless terminal over a radio telephone network, the telecommunications medium may be a radio frequency carrier wave carrying suitable encoded signals representing the computer program and data. Optionally, the carrier wave may be an optical carrier wave for an optical fibre link or any other suitable carrier medium for a telecommunications system.

Illustrated within memory 14 in FIG. 1 are an operating system (OS) 52 and an application 53. Application 53 refers to one or more processes being currently run on the data processing system 10 (by the processor 12). Hereinafter, the term 'process' is used to refer to any program running on the data processing system. Alternatively, application 53 could refer to a process being currently run on a separate data processing system connected to the data processing system 10, and to which memory 14 is accessible. The OS is a software (or firmware) component of the data processing system 10 which provides an environment for the execution of programs by providing specific services to the programs including loading the programs into memory and running the programs. The OS also provides resource allocation when there are multiple users or jobs running simultaneously, including managing the sharing of internal memory among multiple applications and/or processes and handling input and output control, file and data management, communication control and related services. Application programs make requests for services to the OS through an application program interface (not shown).

Figure 2:
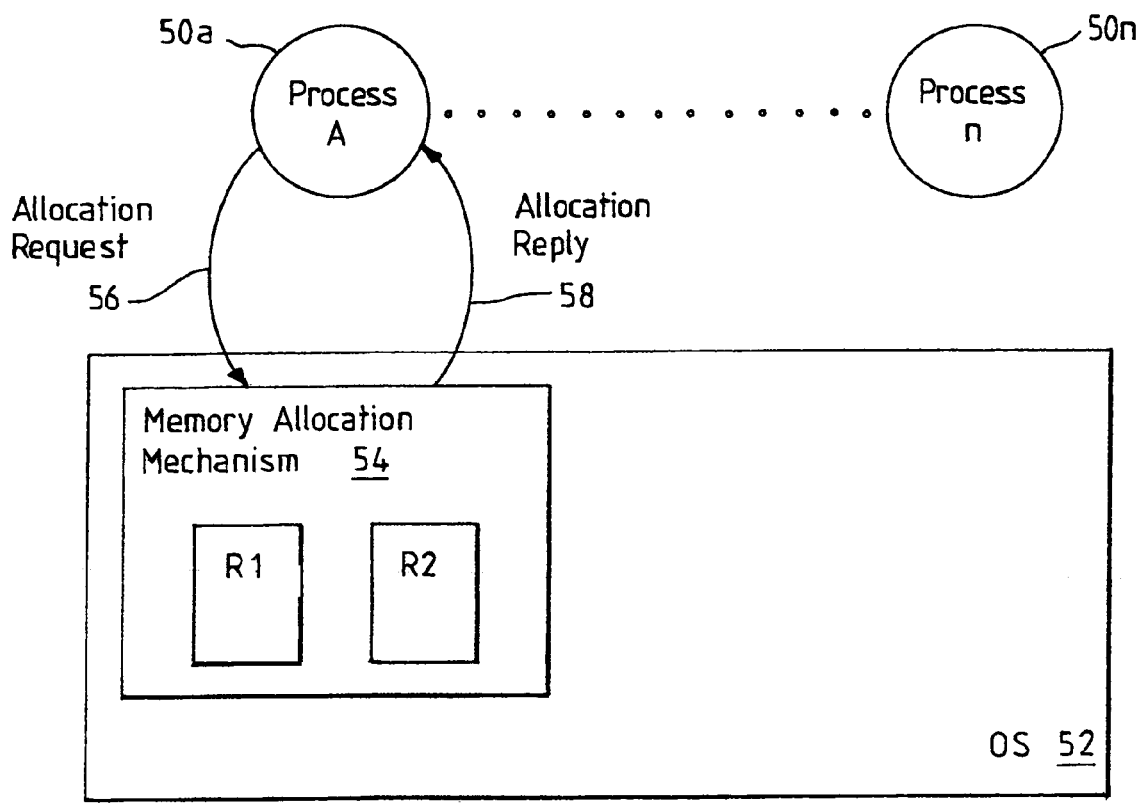
FIG. 2 shows a representation of a process initiating a memory allocation procedure.

Referring to FIG. 2, there is shown a plurality of computer processes, 50a . . . 50n, interacting with an OS 52 of the data processing system 10. The OS includes a memory allocation mechanism 54 which controls the allocation of memory to processes 50a . . . 50n. The memory allocation mechanism maintains a list, R1, of available memory blocks indexed by their size and address (traditionally the address of the first byte of the available block), and a list R2, of unavailable or allocated memory blocks. Herein, the term 'block' is used to refer to any sized block of memory including a single byte of memory. The memory allocation mechanism may allocate blocks of physical memory or areas of a virtual memory which can be translated into a physical memory block by a memory mapping, as is well known in the art.

Figure 3:
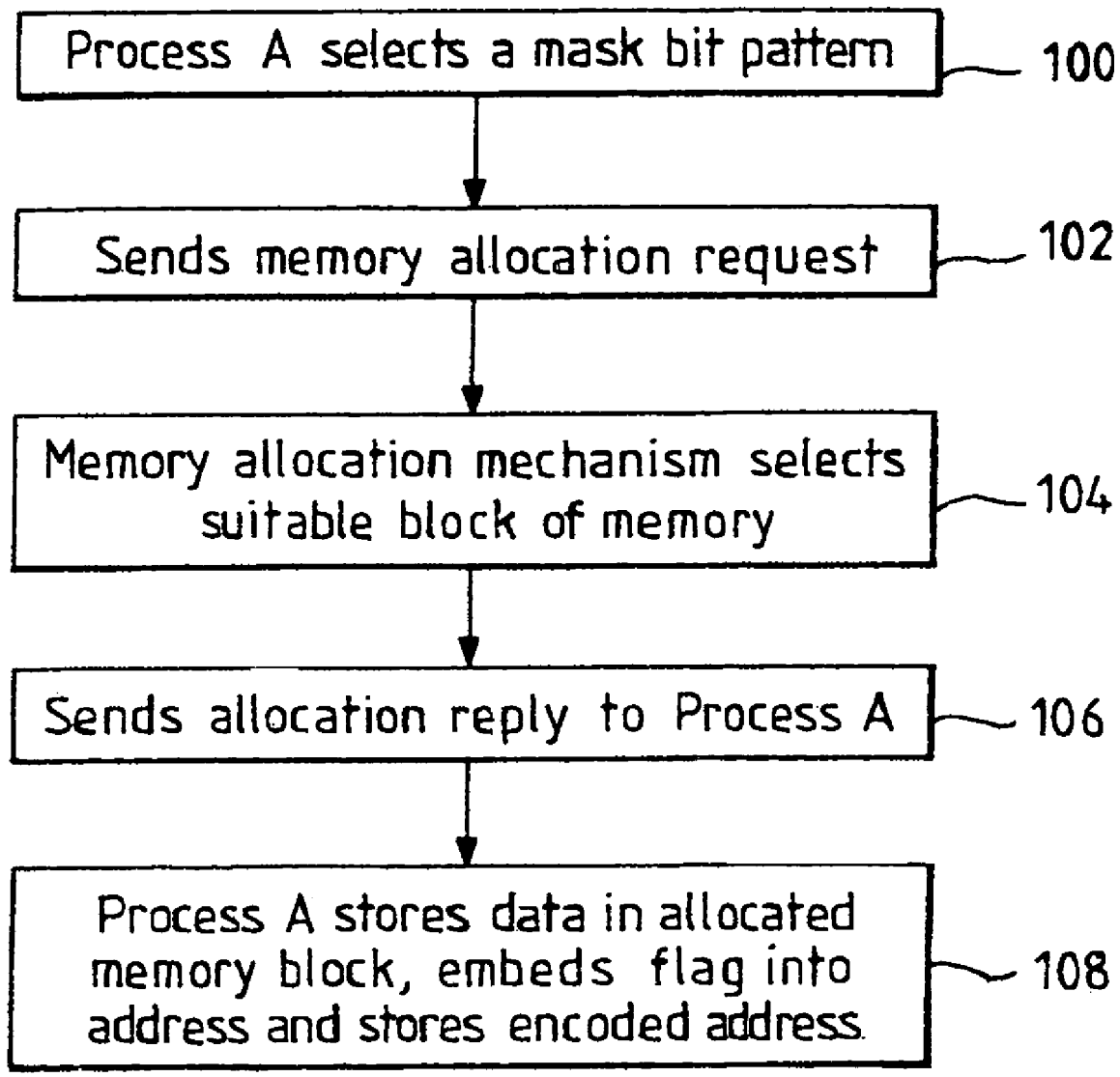
FIG. 3 shows a flow chart indicating steps in a memory allocation in accordance with an embodiment of the invention.

An example of a memory allocation according to one embodiment of the invention will now be described with reference to FIG. 3. In this example, process A requires allocation of a memory block, for example for the storage of a data structure pertaining to a personnel record, the data structure having a certain size t. Process A also wants to embed i bits of metadata relating to the personnel record into the memory address and selects a mask bit pattern with i bits set to a certain value. These i bits need not be the last i bits nor need they all be set to the same certain value, as will be explained later. Process A selects 100 a suitable mask bit pattern, which will enable the memory allocation mechanism to select memory blocks having an address with the required bit pattern. Process A sends 102 an allocation request 56 to the memory allocation mechanism 54. The allocation request includes an indication of the selected mask bit pattern and also indicates the required size of the block of memory. The memory allocation mechanism then looks 104 in its free list R1 to find a free memory block of an appropriate size and which has an address which corresponds correctly to the mask bit pattern, selects an appropriate block, and then returns 106 an allocation response 58 to process A indicating the address of the memory block allocated.

Process A then stores 108 the data structure at the allocated memory location, embeds the i bits of metadata into the allocated address, and then stores the altered memory address, hereinafter termed the encoded memory address, (typically at a previously allocated memory location).

Figure 4A:
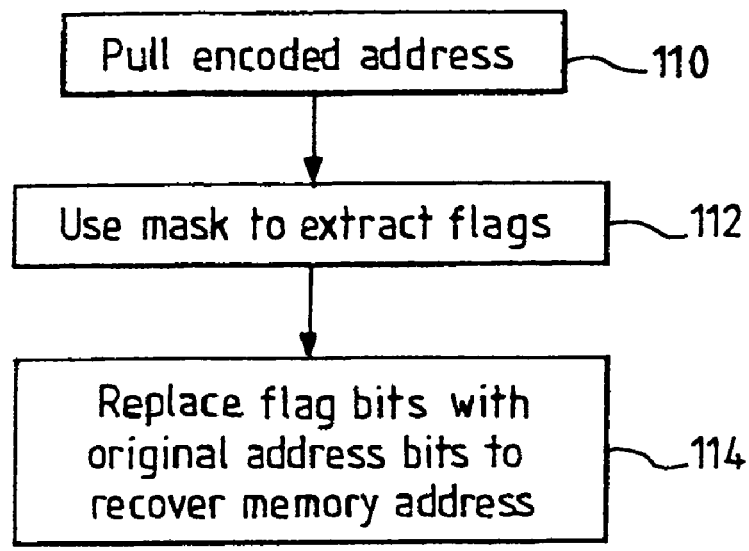
FIGS. 4a and 4b show flow charts of the procedures of memory address and metadata recovery, and metadata update, in accordance with an embodiment of the invention.

Referring to FIG. 4a, when a process wishes to access the data structure, the metadata or the address, the process pulls 110 the encoded address from storage, and uses the mask bit pattern to decode the encoded address, separating out the embedded metadata 112 and replacing 114 the i bits of metadata with the original bits of the memory address. The process may then access the data structure at the memory address. The metadata may include all the information required by the process, in which case it need not access the actual data structure itself.

Figure 4B:
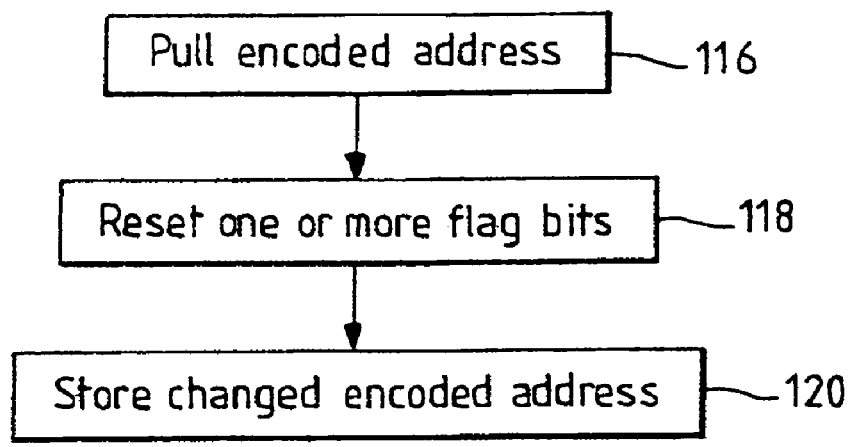

Referring to FIG. 4b, a process may update the metadata by pulling 116 the encoded address from its storage location, and resetting 118 one or more bits of metadata in the encoded address, and then storing 120 the new encoded address. Thus, the data processing system can look at values or flags relating to the data structure and update them in a single atomic instruction.

An example of the memory allocation procedure will be explained in more detail below. In this example, the data structure is a 64-byte personnel record and process A requires a block of memory in which to store the personnel record, and also wants to be able to embed four bits of metadata relating to the personnel record into the memory address. Process A selects a mask with four bits set to a certain value. In the example shown in FIG. 5a, process A selects a mask having all but the bottom four bits set to zero, eg a 32-bit mask bit pattern may be 0000 0000 0000 0000 0000 0000 0000 1111.

Figure 5A:
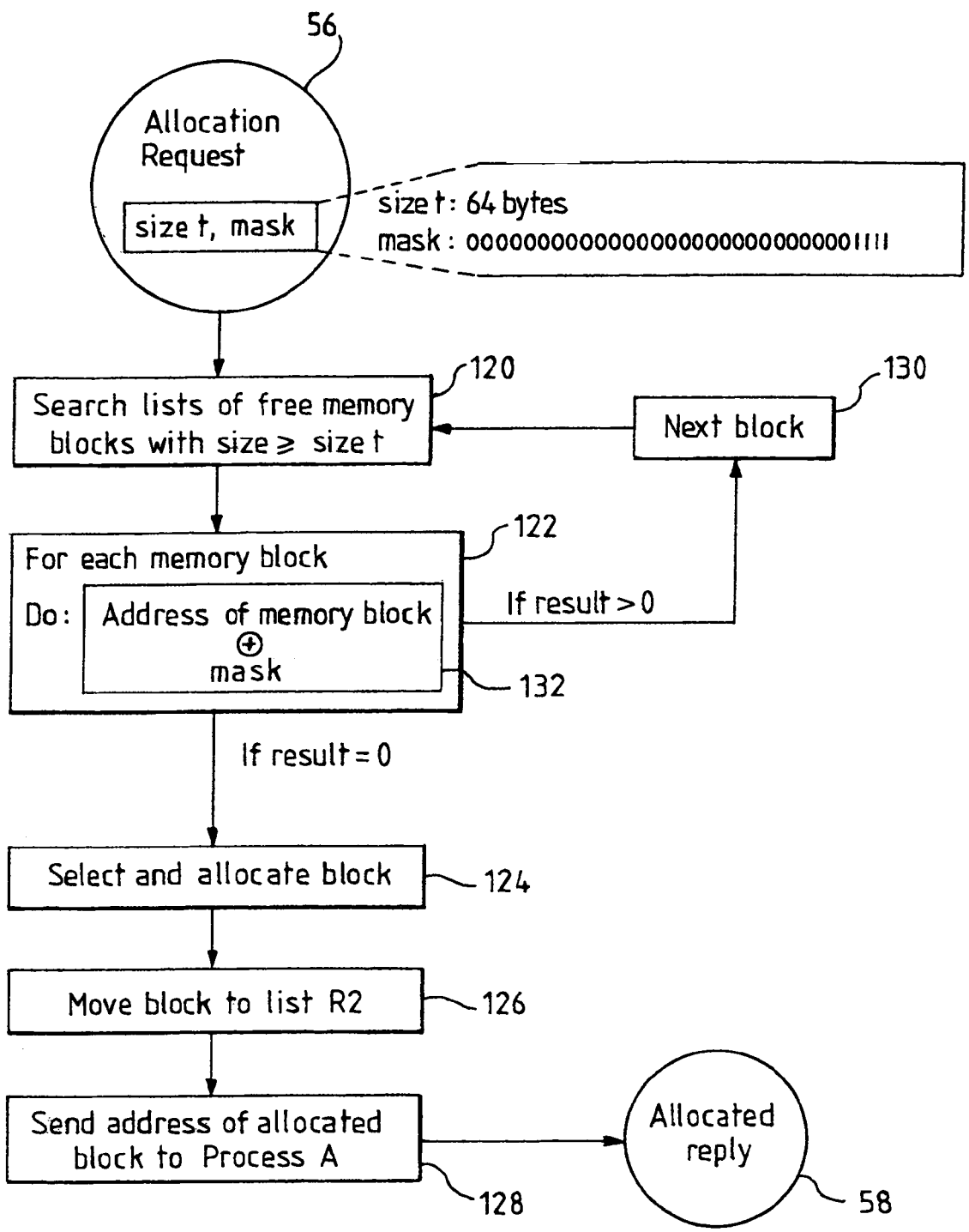
FIGS. 5a and 5b show flow charts of the steps taken in a memory allocation by the memory allocation mechanism and by the requesting process respectively, according to an embodiment of the invention.

Referring to FIG. 5a, the allocation request 56 from process A, which includes an indication of the size of the memory block required as well as the mask bit pattern selected by process A, is sent to the memory allocation mechanism. When the memory allocation mechanism receives the request, it searches through its free list R1 of available memory blocks. Preferably, these are indexed by size and address. First the memory allocation mechanism searches 120 for memory blocks having the requested size, so it looks through all the entries in free list R1 which are indexed by the requested size, that is those which are 64 bytes long. If it finds a free block of exactly 64 bytes it then checks 122 to see whether its address corresponds correctly to the mask. If it does not it moves on to the next block 130.

In the present example, the memory allocation mechanism checks 122 whether the bottom four bits of the address are zero. If they are zero then the memory allocation mechanism selects 124 the memory block, sends 128 an allocation reply 58 to Process A indicating the address of the block allocated, and moves 126 the reference to the allocated memory block from its free list R1 to its allocated list R2.

As will be appreciated by those skilled in the art, the memory allocation mechanism may use additional algorithms to select a memory block, for example the memory allocation mechanism may not immediately select the first memory block which it finds corresponds correctly to the mask bit pattern as in the example described above. Instead, the memory allocation mechanism may find all the memory blocks which correlate correctly to the mask bit pattern, and may use other, known algorithms to select one of these blocks of memory, for example according to which will lead to the most efficient memory usage. Moreover, a number of commonly used memory allocation algorithms could be adapted to benefit from the improvements of the invention, as would readily be understood by those skilled in the art.

Figures 6, 7:
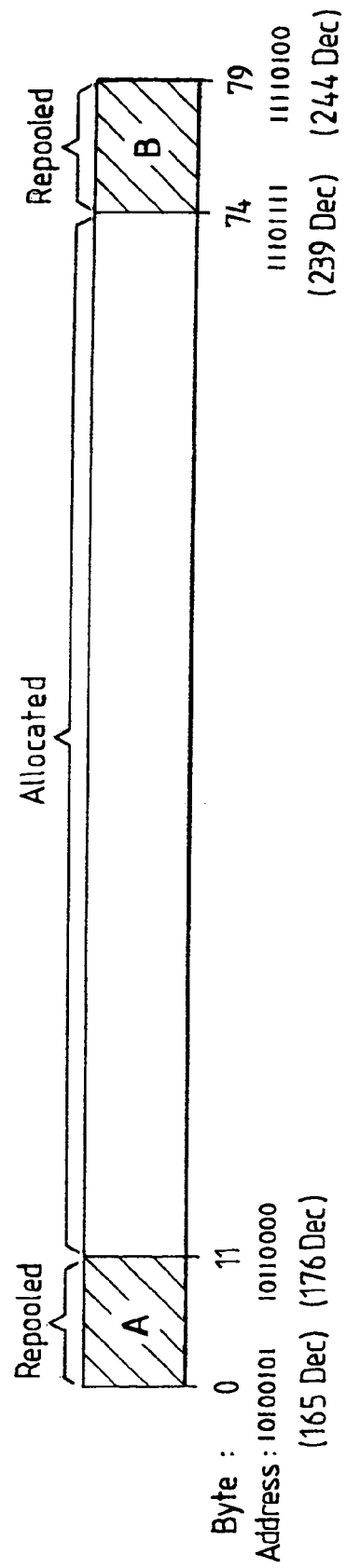
FIG. 6 shows a representation of the operation of comparing a memory address with a mask according to one embodiment of the invention.
FIG. 7 shows the allocation of a memory block in the middle of an available block.

One way the memory allocation mechanism can select memory addresses which correspond correctly to the mask will now be described in more detail with reference to FIG. 6. The memory allocation mechanism uses an AND function 132 to do a logical AND process on the memory address and the MASK. The AND function returns a 1 only if both bits of the mask and memory address are 1s. Thus by using a mask having all but the last four bits as zero, the value of each of the last four bits being 1, the AND operation results in zero only if the last four digits of the memory address are zero, and has a non-zero result if they are not. Thus the memory allocation mechanism checks whether the result of the AND operation is zero or non-zero to check whether the memory address corresponds correctly to the mask.

As will be appreciated, there are other possible methods by which this comparison could be made for example another logical operation such as a NAND operation could be used, and the result required could be non-zero.

If there are no free blocks of exactly 64 bytes or if none of these have addresses with the bottom four bits being zero, then the memory allocation mechanism looks through its list of memory blocks of the next size up, typically 128 bytes. If a block is found which has an address with the bottom four bits all zero then the first 64 bytes of this block may be selected and allocated, with the last 64 bytes being repooled and entered on the list of free 64 byte blocks. If a suitable block has still not been found, the memory allocation mechanism searches through its list of 512-byte blocks, and so on.

If the memory allocation mechanism has not found an appropriate memory block having an address with four zero-value bottom bits after looking through all its lists it may look in a different manner through the lists of blocks. For example it may look at one or more blocks of 80 bytes in length. If we take a quick look at binary numbers we see that numbers divisible by 16 have at least four zeros as the bottom four bits: 16—10000; 32–100000; 48–110000 etc. This means that in every set of sixteen consecutive bytes there will be at least one byte with an address having four zeros in the bottom four bits. By way of explanation, let us look to FIG. 7. This represents a block of available memory of 80 bytes in length. The memory allocation mechanism may look now at the addresses of each of the first sixteen bytes of this block to find one which has at least four zeros as bottom bits. In the example shown in FIG. 7, the 80-byte sized block has a starting address (byte 0) of 1010 0101 and byte 11 of the block has an address with four zero bottom bits, that is 1011 0000. The memory allocation mechanism will then select and allocate bytes 11–74 of the available block to the requesting process and blocks A and B of bytes 0–10 and 75–79 respectively will be repooled to free list R1.

Alternatively, instead of looking at 80-byte long blocks, it may look to split a larger block, such as a 128-byte or a 512-byte long block, into smaller blocks, say of 64-bytes or 128-bytes. For example, it may look at its list of free 128-byte blocks and check to see if it can split any of these in half. Thus it may look to see if the memory address of the start of the second half of the 128-byte block, that is of the last 64 bytes, corresponds correctly to the mask bit pattern. If it does then it selects and allocates the last 64 bytes and repools the first 64 bytes to the free list R1.

Figure 5B:
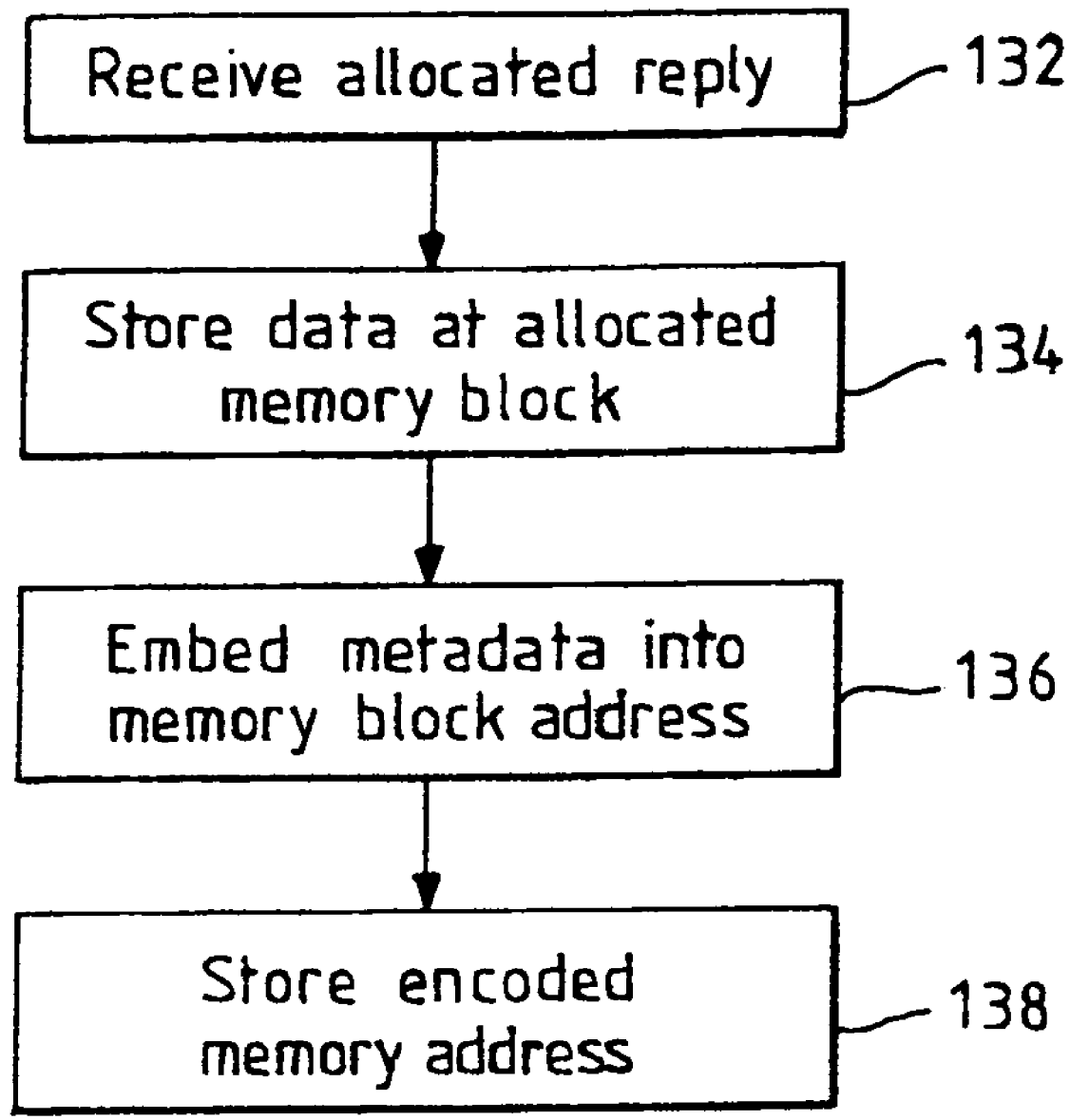

Referring to FIG. 5b, when process A receives 132 the allocation reply it stores 134 the personnel record at the allocated memory location, inserts 136 its four bits of additional metadata relating to the personnel record into the memory address and then stores 138 the embedded memory address (at a location previously allocated).

An example of how the additional information may be inserted into an allocated memory address by a process will now be described in more detail. Typically flag words having only one bit set to one are used, with the position of the set bit in the word indicating to the process which flag the word represents. In this example the four flags could be represented by the following 32-bit words:

Flag 1: 0000 0000 0000 0000 0000 0000 0000 0001;
Flag 2: 0000 0000 0000 0000 0000 0000 0000 0010;
Flag 3: 0000 0000 0000 0000 0000 0000 0000 0100; and
Flag 4: 0000 0000 0000 0000 0000 0000 0000 1000.

To set, or embed, all four flag bits in the memory address, 'Address', the process simply logical ORs them with the memory address:

Encoded Address=Address OR Flag 1 OR Flag 2 OR Flag 3 OR Flag 4.

This will result in an encoded address in which the last four bits are ones, indicating that all four flags are set. To set only some of these flag bits, say Flags 2 and 3, the process will OR only these flags with the memory address.

In the example given above, the mask specified a particular number of least significant bits. However, the mask could instead specify any particular set of bits. For example the the mask might specify the sixth, fifth, fourth, and second least significant bits by ending in 111010.

In another embodiment of the invention, the mask bit pattern selected by a process may be identified by a mask specifying particular bits of interest and, in addition, a set of values for those particular bits. Thus a mask in which all but the bottom four bits are zero, with the bottom four bits being ones, could be used along with a set of values to define a mask bit pattern having a certain non-zero bit pattern in the bottom four bits. In the example where the mask specifies the sixth, fifth, fourth, and second least significant bits, a set of values could be used to specify a value for each of the selected bits. For example if the values are (abcd) and the mask ends in 111010 as above, the process is specifying a mask bit pattern ending in abc0d0. For values (1100), this mask will match with addresses that end in 110000, 110100, 110101, or 110001; each of these addresses having is in the sixth and fifth least significant bits and 0s in the fourth and second least significant bits. In other words, each of these addresses includes the specific mask bit pattern xx110x0x, as the least significant byte, where the sixth, fifth, fourth and second least significant bits are specified, with the bits marked x being unspecified. In practice, the set of one or more values will preferably be provided in the form of a word indicating the required value of each bit of interest in its respective column. Thus, in the example given above the values would be: 0000 0000 0000 0000 0000 0000 00ab c0d0.

Where the mask bit pattern is indicated by a mask plus a set of values, the memory allocation mechanism uses a modification of the memory block selection methods described above. As will be appreciate by those skilled in the art there are many ways in which the selection may be carried out. For example, the memory allocation mechanism may AND a memory block address with the mask, thereby making zero all the bits of the address which are not of interest, that is which are not specified. The mechanism could then compare the result of the AND operation with the values. If these are equal, then the memory block corresponds correctly to the mask bit pattern and may be selected by the memory allocation mechanism.

The steps taken later when a process needs to look at the personnel record will now be described. The process pulls the encoded memory address for the personnel record from storage, and uses the mask to pull out the embedded flags. Going back to the simple example when the mask had all bits but the bottom four bits being zero, and the memory address has been selected to have all four bottom bits as zeros, the four bottom bits of the encoded memory address are flags or other metadata relating to the data stored at the memory address. To recover the original memory address the process simply replaces these bottom four bits with zero values. This can be done using a macro. For example if the encoded address were called 'Fred' and the mask used to embed the address were called 'Fredmask', the original address, 'Address', could be found using the logical process:

Address=Fred AND (NOT Fredmask).

A process may include other requirements in the memory allocation request, such as an indication of a particular range of memory addresses, or area of memory, from which the memory block should be allocated. This indication could be made, for example, by the process selecting a mask with one or more of the most significant bits having a value of one.

Figure 8:
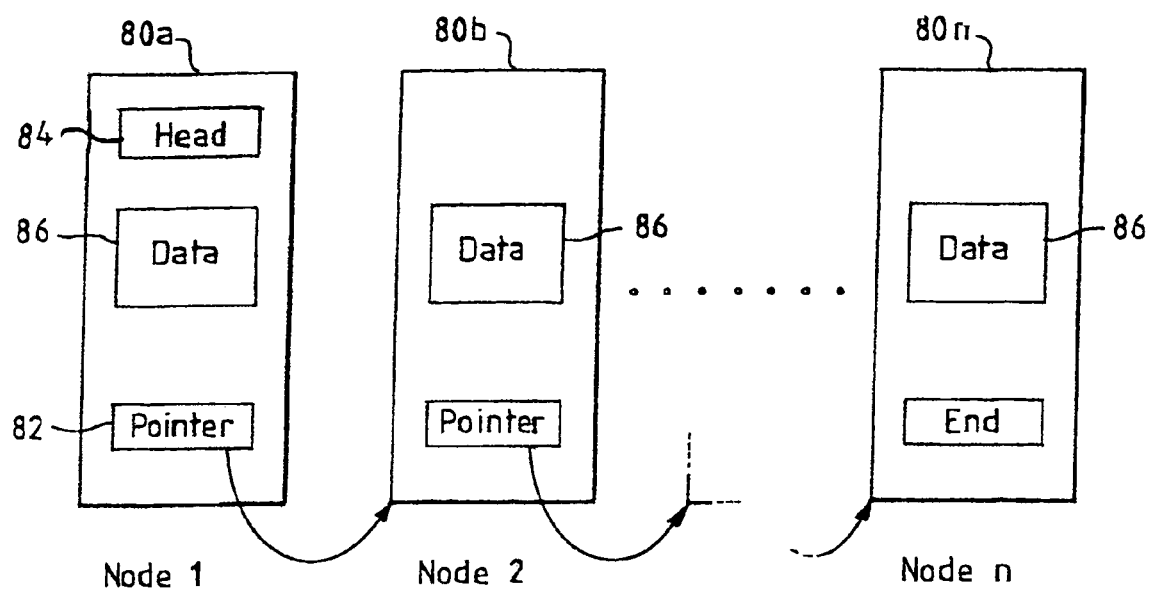
FIG. 8 shows a representation of a linked list in which the present invention may be embodied.

A specific example of the type of flags that can be embedded in an embodiment of the invention will now be described. In this example, a number of employee records 80a, 80b, . . . 80n, is held in a linked list as shown schematically in FIG. 8. Each employee record is a data structure held in memory at a particular memory address, and is called a node in the list. The employee records are linked in that each record includes a pointer 82 to the next record in the list (apart from the final record which indicates that it is the last node in the list). This pointer identifies the address at which the next employee record is stored. A process which is trying to update the employee records, for example to amend salaries, starts at the first employee record of the list, which includes a field 84 identifying it as the head of the list. From then on the process uses the pointers in each node to find the address of the next employee record or node. These pointers in each employee record are preferably encoded memory addresses. The process uses the mask function to separate out the embedded flags and to recover the full address of the next record in the list. The embedded flags may for example indicate the status of the employee to which the next record relates. For instance one flag may indicate whether or not the employee is still employed. If the flag indicates that the employee is not employed the process can decide not to update the next record without having to read the data field 86. This allows the process to be carried out more speedily and more efficiently. Alternatively, a flag may indicate a level at which the employee works and the process may use this to calculate the salary change to be recorded. In a modification, the first node in the list, instead of having a head field 84, may be identified by having a particular flag bit set in its pointer field 82a, and/or the last node in the list may be identified by having a certain address or a certain bit set in its pointer field.

Sometimes a process needs to break the link between neighbouring items in the list, for example to add a new employee record. This can cause problems if at the same time another process is running down the same list. The present invention allows a flag to be embedded into the next pointer in the list, which can indicate to another process that it should not use the pointer as it might not be safe. Then when the first process has finished updating or adding the previous employee record it can update the pointer in the next node in the list to indicate that the pointer is now safe.

Thus embodiments of the present invention allow for more metadata to be embedded in a memory address in a manner that does not depend on the boundary alignment of the platform used. Embodiments of the present invention can be used to provide faster data update with less use of locks.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the preceding example embodiments, the invention is not limited thereto and that there are many possible variations and modifications which fall within the scope of the invention. For example, it is not necessary that the allocation mechanism select a memory block of the exact same size as that identified in the allocation request, for example the block allocated could be larger.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

The invention claimed is:

1. A method of allocating memory in a data processing system having a memory, the method comprising the steps of:
    receiving a memory allocation request from a running process, the request including data relating to the size of the block of memory required and an indication of a mask bit pattern;
    selecting a block of memory of appropriate size and having an address including a bit pattern corresponding correctly to the mask bit pattern; and
    allocating the selected block of memory to the process.

2. A method according to claim 1, further comprising the step of the process sending the memory allocation request to a memory allocation mechanism.

3. A method according to claim 1, wherein the step of allocating the selected block comprises sending an allocation reply to the process, the allocation reply indicating the address of the selected memory block.

4. A method according to claim 1, further comprising the steps of the process embedding one or more bits of metadata into the address of the allocated block of memory, and storing the encoded address.

5. A method according to claim 4, wherein the step of embedding metadata comprises replacing certain bits of the address of the allocated block of memory with flag bits.

6. A method according to claim 1, wherein a memory allocation mechanism has one or more list(s) of free memory blocks, and the selecting step comprises searching through a list for a memory block having an address which corresponds correctly to the mask bit pattern.

7. A method according to claim 6, wherein the memory allocation mechanism also has one or more lists of allocated memory blocks and the allocation step comprises taking the selected block off a list of free memory blocks and adding the selected block to a list of allocated blocks.

8. A method according to claim 1, wherein the selecting step comprises splitting a memory block larger than the requested size into two or more blocks, one of the split blocks having an appropriate size for the memory allocation and having a memory address including a bit pattern which corresponds correctly to the mask bit pattern.

9. A method according to claim 1, further comprising the step of the process selecting a mask bit pattern.

10. A method according to claim 1, wherein the indication of the mask bit pattern comprises a mask, specifying certain bits of an address, and a set of values indicating the required value for each of the specified bits.

11. A method according to claim 10, wherein the step of selecting a memory block includes checking whether each of the certain bits of the memory address of a free block corresponds correctly to the required value indicated in the memory allocation request.

12. A method according to claim 1, further comprising the step of the process storing data in the allocated memory.

13. A method of performing a memory update in a data processing system having a memory, the method comprising the steps of:
    reading an encoded memory address from memory;
    comparing the encoded memory address with a mask bit pattern to determine whether one or more flag bits embedded in the encoded memory address are set;
    resetting one or more of the flag bits in the encoded memory address;
    storing the updated encoded memory address in the memory;
    decoding the memory address by replacing the one or more embedded flag bits with bits of the memory address, in dependence on the mask bit pattern; and
    reading data from that memory address.

14. A memory allocation mechanism for a data processing system, the mechanism being operable to:
    receive a memory allocation request from a process running on the data processing system, the memory allocation request including data indicating the size of a memory block required and a mask bit pattern;
    select a block of memory of appropriate size and having an address including a bit pattern which corresponds correctly to the mask bit pattern; and
    allocate the selected block of memory to the process.

15. A memory allocation mechanism according to claim 14, operable to send an allocation reply to the process indicating the address of the selected memory block.

16. A memory allocation mechanism according to claim 14, operable to maintain one or more list(s) of free memory blocks, and to search through a list for a memory block having an address which corresponds correctly to the mask bit pattern.

17. A memory allocation mechanism according to claim 16, operable to take the selected block off a list of free memory blocks and add the selected block to a list of allocated blocks.

18. A memory allocation mechanism according to claim 14, operable to receive an indication of the mask bit pattern comprising a mask, specifying certain bits of an address, and a set of values indicating the required value for each of the specified bits; and wherein selecting a memory block comprises checking whether the value of each of the specified bits of the memory address of a block corresponds correctly to the required value indicated in the set of values.

19. A data processing system comprising a memory and a memory allocation mechanism according to claim 14.

20. A computer program product in a tangible, computer-readable medium, wherein the tangible, computer-readable medium contains functional descriptive material that, when executed by a computer, directs the computer to perform actions of:
    receiving a memory allocation request from a running process, the request including data relating to the size of the block of memory required and an indication of a mask bit pattern;
    selecting a block of memory of appropriate size and having an address including a bit pattern corresponding correctly to the mask bit pattern; and
    allocating the selected block of memory to the process.

* * * * *